United States Patent
Tokgoz et al.

(10) Patent No.: US 9,008,714 B2
(45) Date of Patent: Apr. 14, 2015

(54) METHOD AND APPARATUS FOR DYNAMICALLY ADJUSTING A RISE-OVER-THERMAL OR NOISE RISE THRESHOLD

(75) Inventors: Yeliz Tokgoz, San Diego, CA (US); Mehmet Yavuz, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/331,395

(22) Filed: Dec. 20, 2011

(65) Prior Publication Data

US 2012/0329399 A1 Dec. 27, 2012

Related U.S. Application Data

(60) Provisional application No. 61/427,083, filed on Dec. 23, 2010.

(51) Int. Cl.
 *H04B 7/00* (2006.01)
 *H04B 17/00* (2006.01)
 *H04W 52/24* (2009.01)

(52) U.S. Cl.
 CPC ........... *H04B 17/005* (2013.01); *H04W 52/243* (2013.01)

(58) Field of Classification Search
 CPC .................. H04W 52/243; H04B 17/345
 USPC ............................. 455/63.1, 67.11
 See application file for complete search history.

(56) References Cited

U.S. PATENT DOCUMENTS

| 7,525,909 B2 * | 4/2009 | Fan et al. ............... 370/230 |
| 7,881,725 B2 | 2/2011 | Rong et al. |
| 2004/0258035 A1 * | 12/2004 | Fan et al. ............... 370/342 |

(Continued)

FOREIGN PATENT DOCUMENTS

| CN | 100566291 C | 12/2009 |
| WO | WO2010104426 A1 | 9/2010 |

OTHER PUBLICATIONS

3rd Generation Partnership Project; Technical Specification Group Radio Access Networks; FDD Home NodeB RF Requirements Work Item Technical Report (Release 8), 3GPP Standard; 3GPP TR 25.967, 3rd Generation Partnership Project (3GPP), Mobile Competence Centre ; 650, Route Des Luci0les ; F-06921 Sophia-Antip0lis Cedex ; France, No. 2.0.0, Feb. 1, 2009, pp. 1-58, XP05038087.

(Continued)

*Primary Examiner* — Lewis West

(57) ABSTRACT

Methods and apparatuses are provided that include adjusting rise-over-thermal (RoT) or noise rise (NR) threshold based on detecting interference from one or more devices. A device can communicate within close proximity of a femto node such that the device does not respond to power down commands from the femto node due to operating at a minimum transmit power. The device can cause the RoT or NR at the femto node to potentially rise over a threshold, however. Thus, the femto node can increase the RoT or NR threshold to allow the device to communicate with the femto node without impacting other devices communicating with the femto node. Out-of-cell interference from devices communicating with other base stations can be detected as well, and the RoT or NR threshold can be adjusted based thereon.

15 Claims, 12 Drawing Sheets

(56) References Cited

U.S. PATENT DOCUMENTS

| | | | | |
|---|---|---|---|---|
| 2008/0062925 | A1* | 3/2008 | Mate et al. | 370/331 |
| 2009/0082026 | A1 | 3/2009 | Yavuz et al. | |
| 2009/0137241 | A1 | 5/2009 | Yavuz et al. | |
| 2009/0286563 | A1* | 11/2009 | Ji et al. | 455/501 |
| 2010/0167778 | A1* | 7/2010 | Raghothaman et al. | 455/522 |
| 2010/0304778 | A1* | 12/2010 | Goia et al. | 455/522 |
| 2011/0128926 | A1* | 6/2011 | Nama et al. | 370/329 |

OTHER PUBLICATIONS

International Search Report and Written Opinion—PCT/US2011/066657—ISAEPO—Apr. 5, 2012.

Vodafone Group et al., "Methods and Tests to limit adjacent channel interference for Home NodeB", 3GPP Draft; R4-082020, 3rd Generation Partnership Project (3GPP), Mobile Competence Centre ; 650, Route Des Lucioles ; F-06921 Sophia-Antip0lis Cedex; France, vol. RAN WG4, No. Jeju; 20080826, Aug. 26, 2008, XP050180517, [retrieved on Aug. 26, 2008].

ETSI TR 125 967 V9.0.0 (Feb. 2010), Universal Mobile Telecommunications System (UMTS); FDD Home Node B (HNB) Radio Frequency (RF) requirements (FDD) (3GPP TS 25.967 version 9.0.0 Release 9), 56 pages.

3GPP TR 25.967 9.0.0 (May 2009), 3rd Generation Partnership Project; Techinical Specification Group Radio Access Networks; Home Node B Radio Frequency (RF) Requirements (FDD) (Release 9), pp. 1-55.

\* cited by examiner

METHOD AND APPARATUS FOR DYNAMICALLY ADJUSTING A RISE-OVER-THERMAL OR NOISE RISE THRESHOLD

CLAIM OF PRIORITY UNDER 35 U.S.C. §119

The present Application for patent claims priority to Provisional Application No. 61/427,083, entitled "DYNAMIC RISE-OVER-THERMAL THRESHOLD FOR LOW POWER BASE STATIONS" filed Dec. 23, 2010, assigned to the assignee hereof and hereby expressly incorporated by reference herein.

BACKGROUND

1. Field

The following description relates generally to wireless network communications, and more particularly to adjusting rise-over-thermal or noise rise threshold at a base station.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

Low power base stations can be configured with a rise-over-thermal (RoT) or noise rise (NR) threshold to manage interference potentially caused by devices communicating therewith. The RoT or NR threshold can relate to a measure of total received signal power over a thermal noise floor. For example, when a RoT or NR threshold is reached, a low power base station can reduce reverse link data rate of one or more devices to ensure the RoT or NR does not exceed the threshold. Similarly, for example, a low power base station can command a device to increase RL power so long as the RoT or NR threshold is not exceeded as a result of the power increase.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with adjusting a rise-over-thermal (RoT) or noise rise (NR) threshold at a base station based on interference caused by one or more devices. For example, as a device communicating with the base station moves within a certain distance of the base station, the device may no longer be able to respond to power down commands from the base station, and thus may begin to cause RoT or NR to rise over a threshold at the base station. In one example, the base station can cause this and other devices to decrease data rate and/or power in an attempt to decrease the RoT or NR below the threshold, which may not be desirable. Thus, the base station can increase the RoT or NR threshold to allow the nearby device to communicate with the base station without rate reduction and without impacting the other devices. Once the nearby device moves outside of the certain distance of the base station, the base station can lower the RoT or NR threshold. In another example, where a device communicating with a macro or other base station causes increase in RoT or NR over the threshold at a low power base station, the low power base station can similarly increase the RoT or NR threshold until the device no longer causes the increase in RoT or NR.

According to an example, a method for adjusting a RoT or NR threshold is provided including communicating with one or more devices to provide network access and detecting a change in interference caused by a signal from at least one device in the one or more devices. The method further includes adjusting an RoT or NR threshold based at least in part on the detecting the change in the interference.

In another aspect, an apparatus for adjusting a RoT or NR threshold is provided. The apparatus includes at least one processor configured to communicate with one or more devices to provide network access and detect a change in interference caused by a signal from at least one device in the one or more devices. The at least one processor is further configured to adjust an RoT or NR threshold based at least in part on the detecting the change in the interference. The apparatus also includes a memory coupled to the at least one processor.

In yet another aspect, an apparatus for adjusting a RoT or NR threshold is provided that includes means for communicating with one or more devices to provide network access and means for detecting a change in interference caused by a signal from at least one device in the one or more devices. The apparatus further includes means for adjusting an RoT or NR threshold based at least in part on the detecting the change in the interference.

Still, in another aspect, a computer-program product for adjusting a RoT or NR threshold is provided including a non-transitory computer-readable medium having code for causing at least one computer to communicate with one or more devices to provide network access and code for causing the at least one computer to detect a change in interference caused by a signal from at least one device in the one or more devices. The computer-readable medium further includes code for causing the at least one computer to adjust an RoT or NR threshold based at least in part on the detecting the change in the interference.

Moreover, in an aspect, an apparatus for adjusting a RoT or NR threshold is provided that includes a transceiver component for communicating with one or more devices to provide network access and an interference detecting component for detecting a change in interference caused by a signal from at least one device in the one or more devices. The apparatus further includes a RoT threshold adjusting component for adjusting an RoT or NR threshold based at least in part on the detecting the change in the interference.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
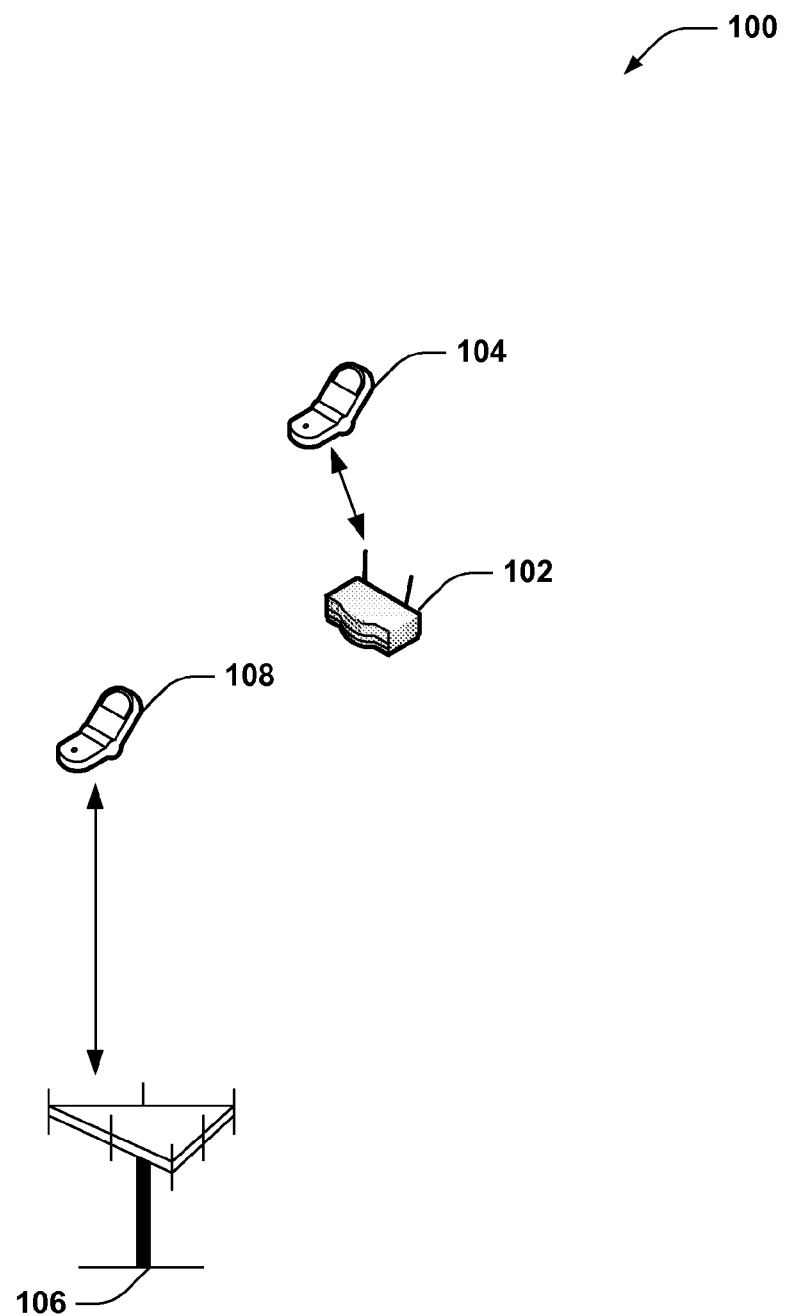
FIG. 1 is a block diagram of an example wireless communication system for adjusting a rise-over-thermal (RoT) or noise rise (NR) threshold.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to dynamically adjusting a rise-over-thermal (RoT) or noise rise (NR) threshold at a low power base station. For example, a device communicating with the low power base station can be in close proximity of the low power base station, such that the device is communicating at a power that causes the RoT or NR to rise over a threshold. Since the device can implement a minimum transmit power, when the device is within a certain distance, the device may not respond to further power down commands from the low power base station and thus causes rise in RoT and/or NR. In this example, the low power base station can raise the RoT or NR threshold to accommodate the device without impacting transmission power and rate of this and other devices communicating with the low power base station. In another example, the low power base station can detect out-of-cell interference from one or more devices (e.g., devices communicating with a macrocell or a different low power base station) and can accordingly raise an RoT or NR threshold to allow increase in reverse link throughput at one or more other devices communicating with the low power base station in view of the interference. Moreover, for example, there can be an upper limit to the RoT or NR threshold based at least in part on a location of the low power base station with respect to a macrocell or one or more other low power base stations.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates adjusting a RoT or NR threshold. System 100 can include a femto node 102 that communicates with a device 104 to provide access to a core wireless network or other services. System 100 also includes a base station 106 that similarly communicates with device 108. For example, femto node 102 can be substantially any low power base station, or a macro base station in one example. Base station 106 can also be a low power base station or a macrocell base station, relay node, mobile base station, a device communicating with device 108 in a peer-to-peer or ad-hoc mode, a portion thereof, etc. In addition, devices 104 and 108 can each be a UE, modem (or other tethered device), a portion thereof, and/or substantially any device that wirelessly communicates with one or more base stations or other devices in a wireless network.

According to an example, femto node 102 can communicate with device 104 and/or additional devices according to an RoT or NR threshold. As described, a data rate or power for reverse link (RL) communications from device 104 can be adjusted such that the RoT or NR at femto node 102 remains within the RoT or NR threshold. For example, this can include femto node 102 transmitting a data rate adjustment command, such as busy indicator, such as the Reverse Activity Bit in the EV-DO system a power down command, and/or other adjustment, sent to device 104 to control the RL data rate or power.

In one example, femto node 102 can adjust the RoT or NR threshold, which can result in adjusting RL data rate and/or corresponding RL transmission power of device 104. For example, femto node 102 need not operate at a high RoT or NR threshold all the time; in one example, the data rate of a plurality of devices can be increased based on a high RoT or NR threshold such that a race condition can occur for the devices. The corresponding increase in data rate, however, may result in substantially the same throughput at the devices since the data rates for all of the plurality of devices are raised. Thus, the femto node 102 can operate at a lower RoT or NR threshold such to prevent such a race condition. It is to be appreciated that modifying data rate of device 104 can be performed by direct rate allocation indicated by femto node 102, femto node 102 sending a busy indication to the device 104 to facilitate determining a data rate, and/or the like.

In one example, where device 104 is within close proximity to femto node 102, the RL power needed at the device 104 for transmitting RL signals to femto node 102 can become low (e.g., and lower as device 104 moves closer to femto node 102). In some configurations, however, device 104 can transmit within a defined power range (or at least according to a minimum transmit power), such that the device 104 cannot lower RL power beyond a minimum transmit power of the power range. In this example, as device 104 moves nearer to femto node 102 and cannot lower the RL power because the RL power is at the minimum transmit power, femto node 102 can receive the RL signals transmitted from device 104 at a higher power than necessary (and/or a higher power than specified for device 104 by femto node 102), which can cause an increase in RoT or NR at femto node 102. This can cause femto node 102 to attempt to decrease power of all devices communicating therewith or take other measures in view of the RoT or NR threshold being exceeded. Thus, for example, femto node 102 can dynamically increase the RoT or NR threshold to allow femto node 102 to continue communicating with device 104 and/or other devices. Once the device 104 moves further from femto node 102 (e.g., which can be detected by decrease in RoT or NR), femto node 102 can again dynamically decrease the RoT or NR threshold, as described.

In another example, device 108 can be within close proximity of femto node 102, and signals transmitted from device 108 to base station 106 can cause out-of-cell interference to communications between femto node 102 and one or more devices, such as device 104. For example, femto node 102 can detect interference from device 108; in one example, this can include determining an increase in RoT or NR above a threshold or detecting explicit signals from device 108. In response, for example, femto node 102 can dynamically adjust the RoT or NR threshold to mitigate impact of the interference to device 104 and/or other devices communicating with the femto node 102. This can mitigate the effect of interference from device 108 by allowing device 104 or other devices to communicate with femto node 102 at a higher data rate in view of raising the RoT or NR threshold. Similarly, femto node 102 can detect departure of device 108 (e.g., by detecting a lack of interfering signals and a higher RoT or NR threshold), and can accordingly decrease the RoT or NR threshold.

Figure 2:
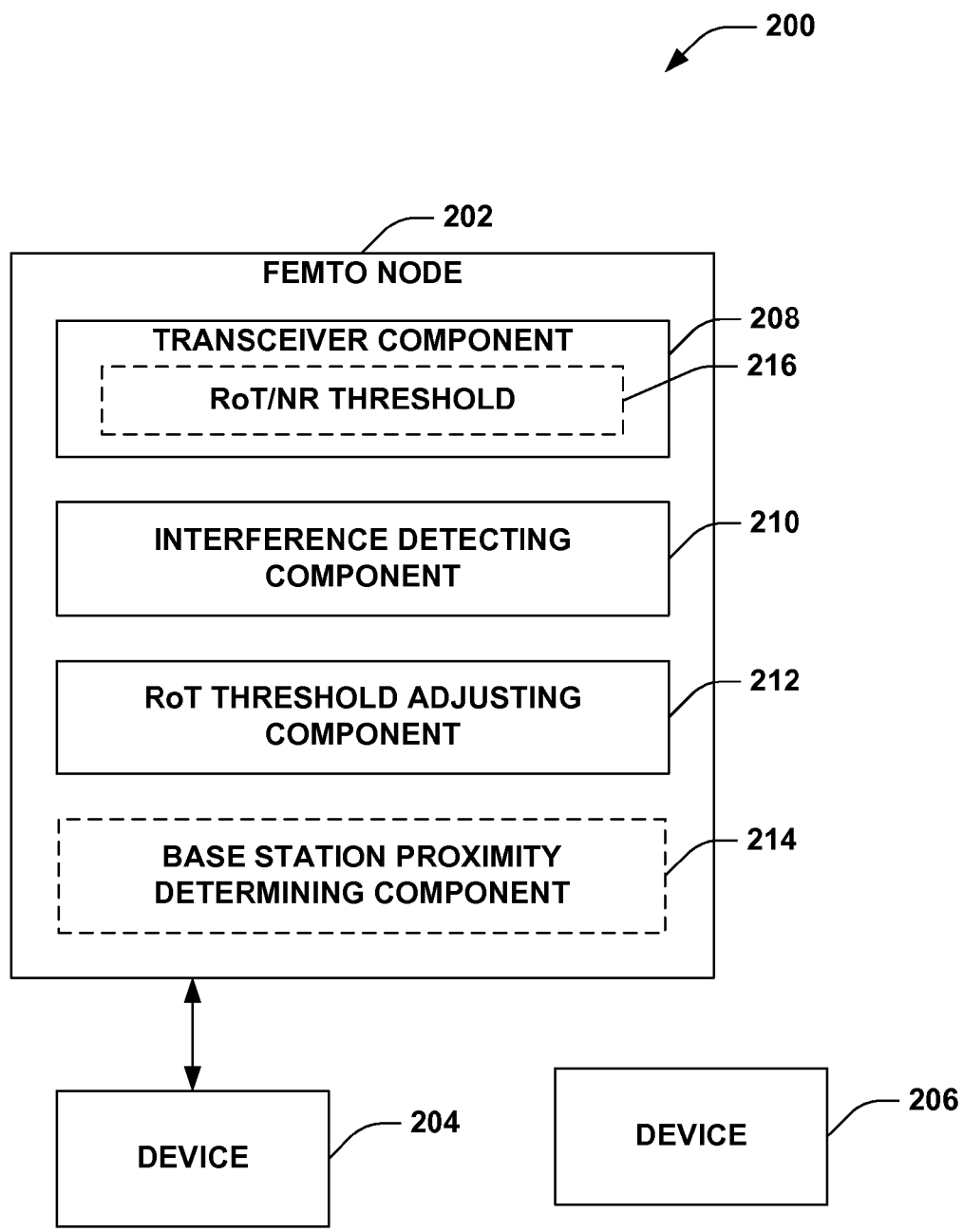
FIG. 2 is a block diagram of an example wireless communication system for adjusting a RoT or NR threshold based on detected interference.

Turning now to FIG. 2, an example wireless communication system 200 that facilitates adjusting an RoT or NR threshold is illustrated. System 200 can include a femto node 202 that provides one or more devices, such as device 204, with access to a wireless network or other communication services. System 200 can also comprise a device 206 that communicates with one or more other base stations (not shown). For example, as described, femto node 202 can be a substantially any low power base station, a macro base station in one example, or similar base station, and devices 204 and 206 can each be a UE, modem, etc. Femto node 202 can comprise a transceiver component 208 for communicating with one or more devices, an interference detecting component 210 that determines interference from one or more devices, an RoT threshold adjusting component 212 that dynamically increases or decreases an RoT or NR threshold according to determined interference, and an optional base station proximity determining component 214 that can obtain a proximity of femto node 202 to one or more other base stations.

According to an example, femto node 202 can communicate with one or more devices using transceiver component 208, which can include one or more transmitters, receivers, related antennas and processors, etc., as described further herein. For example, transceiver component 208 can communicate with device 204 to provide wireless network access thereto, as described. In an example, transceiver component 208 can operate according to a RoT and/or NR threshold 216 ensuring that signals caused by communications from one or more devices do not cause RoT or NR at the femto node 202 to exceed the RoT or NR threshold 216. For example, transceiver component 208 can provide power control commands based on the RoT or NR relative to the threshold 216 to control transmission power used at one or more devices, such as device 204.

In one example, RoT threshold adjusting component 212 can set the RoT or NR threshold 216 to a relatively low value (e.g., to avoid a power race condition increasing device 204 power and other device powers without substantial throughput gains, as described previously). In an example, interference detecting component 210 can determine the device 204 is in close proximity to femto node 202 such to cause increase in RoT or NR at the femto node 202. For example, this can include interference detecting component 210 determining an increase in a received signal power of one or more RL signals from the device at transceiver component 208.

In addition, interference detecting component 210 can detect that the device 204 is transmitting the one or more RL signals at a minimum transmit power, as described, which can be based on one or more additional determinations. In one example, interference detecting component 210 can determine that the device 204 is at the minimum transmit power based on detecting that the device 204 is not responding to a command to decrease the RL transmit power. Transceiver component 208, as described, can command device 204 to decrease RL transmit power based on detecting increase in signal power and/or interference from the device 204 (e.g., an increase in signal-to-interference-and-noise ratio (SINR), and/or the like). Thus, interference detecting component 210 can detect that the device 204 is not responding to the command, which can include determining a subsequent communication from device 204 at a same or higher received signal power and/or interference (e.g., and/or detecting a corresponding increase in RoT or NR), receiving a communication from device 204 that the RL transmit power cannot be decreased (e.g., due to being at the minimum level), etc.

In any case, RoT threshold adjusting component 212 can dynamically raise the RoT or NR threshold 216 of femto node 202 to provide an adequate threshold for communications from device 204 and/or other devices based on device 204 being in close proximity to femto node 202. In one example, this can include raising the RoT or NR threshold 216 based on a level that signals from device 204 cause the RoT or NR to exceed the current threshold (e.g., as a proportion thereof), based on a detected amount of signal power (e.g., SINR) and/or interference as compared to a threshold interference or otherwise, based on a fixed threshold or a fixed threshold increase for the occurrence, and/or the like. Interference detecting component 210 can additionally determine a subsequent moving of device 204 away from femto node 202 (e.g., based at least in part on detecting a decrease in RoT or NR, determining an increase in RL power for the device 204 from a signal received therefrom by transceiver component 208, receiving an indication that the device 204 is no longer transmitting at the minimum transmit power, and/or the like). In this case, RoT threshold adjusting component 212 can dynamically decrease the RoT or NR threshold 216 in this example. This can include decreasing the threshold to a previous value (e.g., before device 204 caused modification of the threshold).

In another example, device 206 can be transmitting signals to a different base station and can move closer to femto node 202 causing some level of interference thereto. Interference detecting component 210 can determine an increase in out-of-cell interference generally or as being caused by device 206. For example, interference detecting component 210 can determine an increase RoT or NR caused by the interference, can detect signals from device 206, and/or the like. Based at least in part on detecting the interference, RoT threshold adjusting component 212 can dynamically increase the RoT or NR threshold 216. For example, this allows device 204 to increase RL power (e.g., based on a command from femto node 202) and experience improved throughput in face of the interference.

In addition, interference detecting component 210 can determine lower interference from device 206 (e.g., as device 206 moves away from femto node 202, reselects to femto node 202 for wireless network access, etc.). For example, this can be based at least in part on detecting lowering in RoT or NR, detecting a lowered power of signals from device 206 specifically, and/or the like. In this example, RoT threshold adjusting component 212 can lower the RoT or NR threshold 216. It is to be appreciated that RoT threshold adjusting component 212 can increase and decrease RoT or NR in proportion to the level of interference detected by interference detecting component 210, or can adjust the RoT or NR threshold 216 in one or more fixed increments or decrements, etc. In addition, for example, RoT threshold adjusting component 212 can lower the RoT or NR threshold 216 according to a decay rate (e.g., as a proportion thereof) upon interference detecting component 210 determining at least a threshold decrease in interference from device 206.

Moreover, for example, RoT threshold adjusting component 212 can increase the RoT or NR threshold 216 according to an upper limit. In one example, the upper limit can be determined or otherwise configured based at least in part on a known or determined proximity of femto node 202 to one or more other base stations. In one example, femto node 202 can include the base station proximity determining component 214 that can set the upper limit for the RoT or NR threshold 216 based at least in part on determining a proximity of femto node 202 to one or more other base stations.

For example, base station proximity determining component 214 can determine a proximity based at least in part on receiving signals from other base stations. The upper limit can be set as a function of the received signals (e.g., a lower upper limit for stronger received signals so as to minimize interference caused to the other base station). In another example, base station proximity determining component 214 can determine the proximity based at least in part on location information, such as a determined location of femto node 202 (e.g., using global positioning system (GPS), observed time difference of arrival or other triangulation techniques, etc.) and a known or received location of the other base station (e.g., obtained from the other base station over a backhaul connection thereto, from a core network component, from one or more mobile devices, etc.), and/or the like. Thus, the proximity determination can be at substantially any level of accuracy (e.g., coarse—according to received signals, fine—using GPS, and/or substantially any level in between). The upper limit can be set as a function of the proximity, which can include setting the upper limit as a proportion of the proximity, and a value mapped to a given range of proximity, and/or the like. In yet another example, the upper limit can be a configured value.

Figure 3:
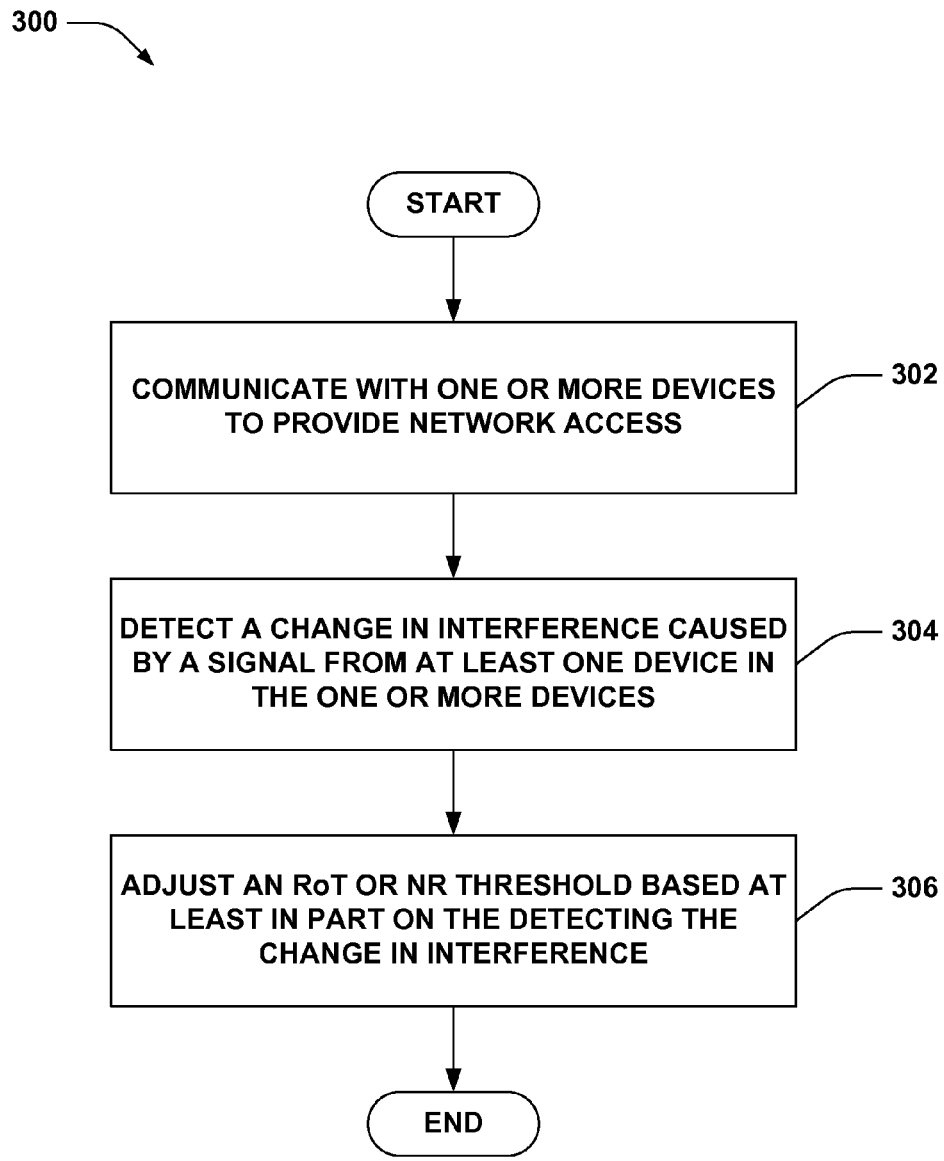
FIG. 3 is a flow chart of an aspect of an example methodology for adjusting RoT or NR threshold.
Figure 4:
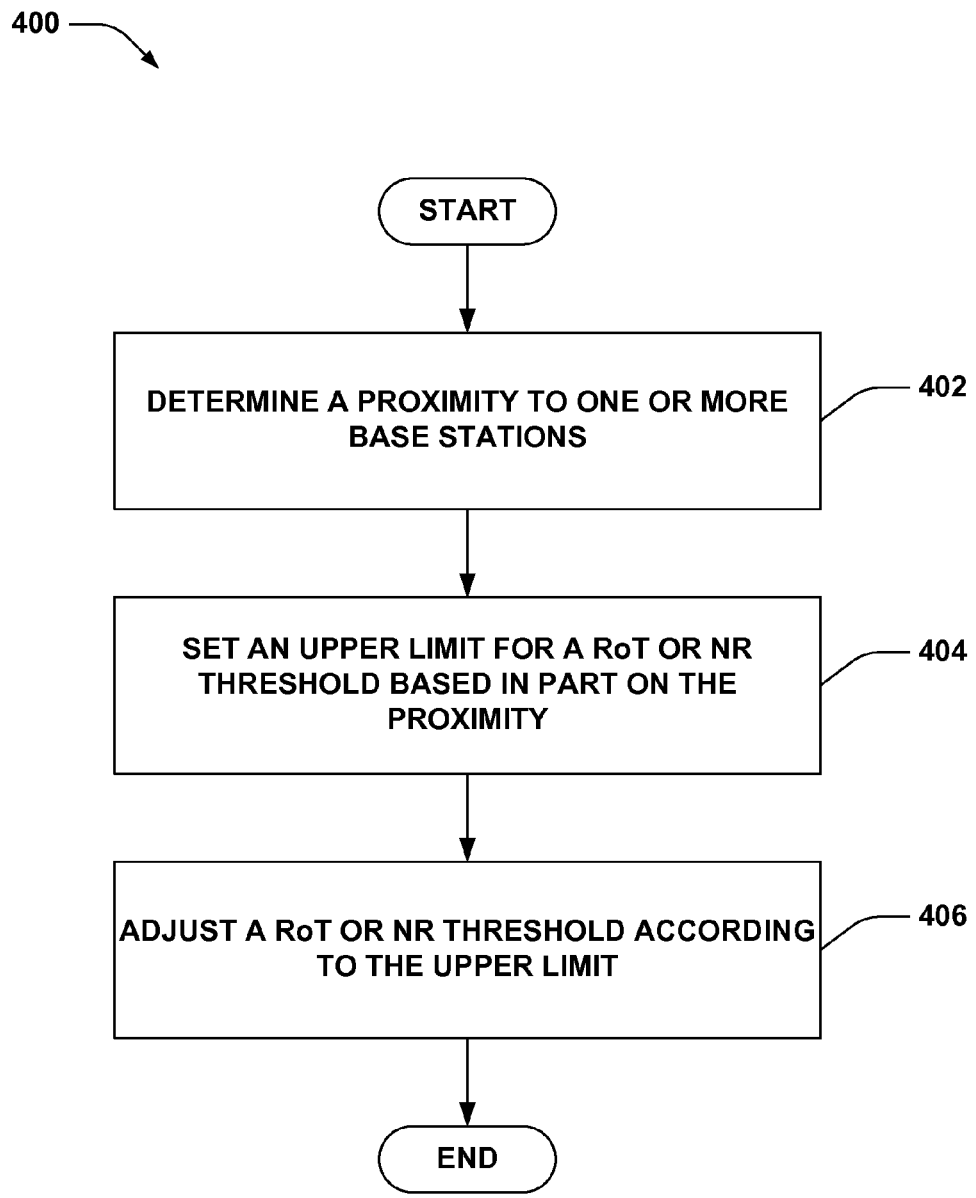
FIG. 4 is a flow chart of an aspect of an example methodology for setting an upper limit for RoT or NR threshold adjustment.
Figure 5:
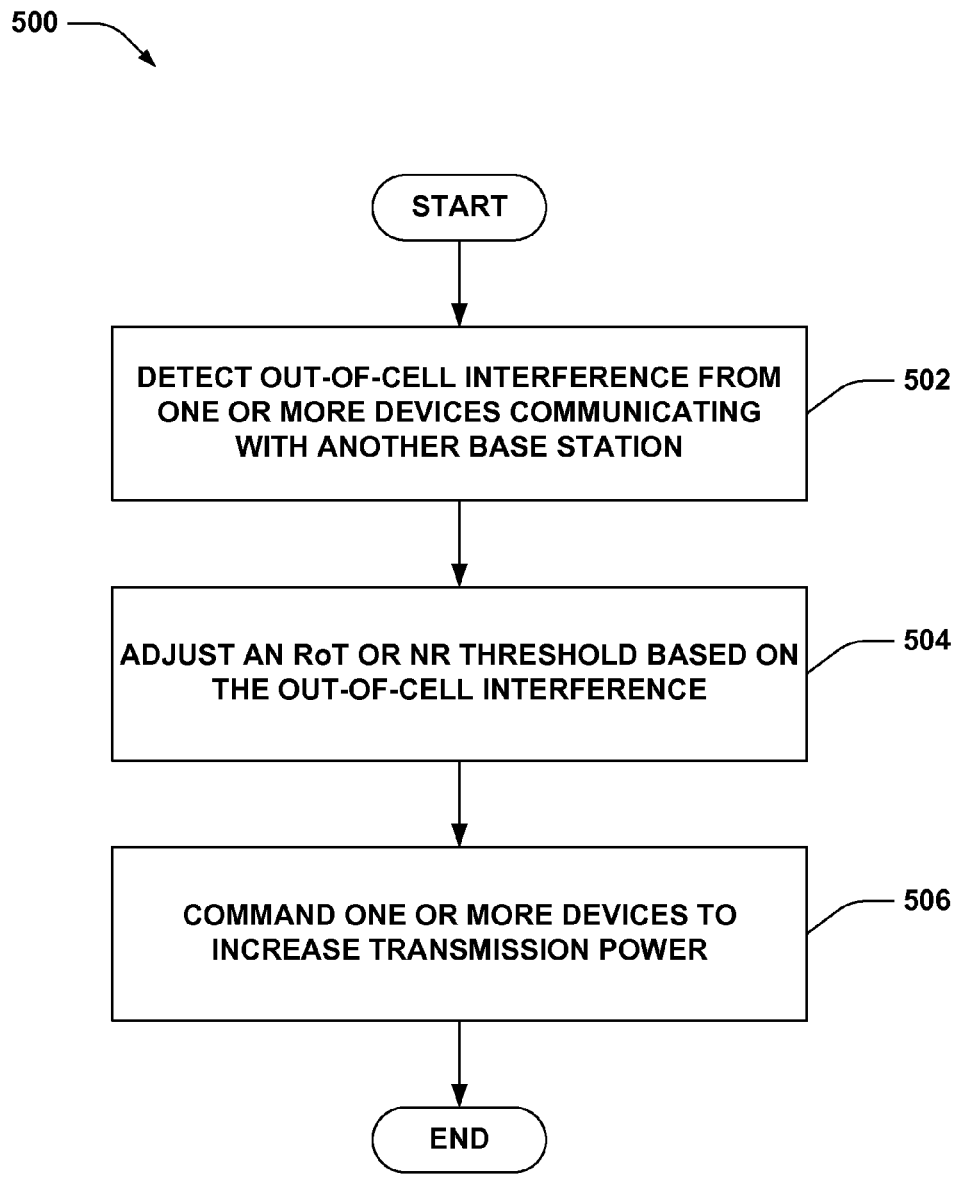
FIG. 5 is a flow chart of an aspect of an example methodology for adjusting RoT or NR threshold based on out-of-cell interference.

FIGS. 3-5 illustrate example methodologies relating to adjusting a RoT or NR threshold based on interference from one or more devices. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 3 depicts an example methodology 300 for adjusting an RoT or NR threshold. At 302, one or more devices can be communicated with to provide network access. For example, connections can be established with the devices to receive communications therefrom and/or transmit communications thereto. The connections can be one or more radio interface connections that can be interfered by other devices and/or can cause interference to one or more devices.

At 304, a change in interference caused by a signal from at least one device in the one or more devices can be detected. For example, this can include detecting increase in signal power of the signal from the device, detecting that signal power (e.g., SINR) or interference caused by the signal exceeds a threshold, and/or the like. As the received signal power of the signal rises, commands can be sent to the device to decrease power to avoid exceeding the RoT or NR threshold. Where such commands are sent to the device and the received signal power does not decrease (e.g., and/or increases), it can be determined that the device is operating at a minimum transit power. In another example, the device can indicate that it is operating at the minimum transmit power. In any case, the change in interference can be determined to be caused by the at least one device based on detecting an increase in received power of a signal (e.g., SINR) from the device, though the device is determined to be operating at the minimum transmit power.

At 306, an RoT or NR threshold can be adjusted based at least in part on the detecting the change in RoT or NR. For example, the RoT or NR threshold can be adjusted as a function of the change in interference, according to one or more configured increments or decrements, based on a value mapped to a range of RoT or NR, based on an upper limit, and/or the like. In another example, at 304, the detected change can relate to determining a decrease in interference caused by the device transmitting at the minimum transmit power moving outside of the vicinity, determining an increase in transmit power by the device and a corresponding decrease in received signal power, etc. In this example, at 306, the RoT or NR can be adjusted to a previous threshold, as described.

FIG. 4 illustrates an example methodology 400 for adjusting an RoT or NR threshold based on an upper limit. At 402, a proximity to one or more base stations can be determined. For example, this can be determined based in part on detecting signals transmitted by the one or more base stations (e.g., determining the signals are at least at a threshold power), obtaining location information regarding the one or more base stations (e.g., from a network configuration, from one or more devices, etc.), and/or the like. For example, the proximity can be determined as a value (e.g., an estimated distance, a measured pathloss, and/or the like) or an indication that the one or more base stations are within a threshold vicinity, etc.

At 404, an upper limit can be set for a RoT or NR threshold based in part on the proximity. For example, this can be a function of the proximity (e.g., where the proximity is a value) such that a close proximity to one or more base stations can result in setting a lower upper limit.

At 406, a RoT or NR threshold can be adjusted according to the upper limit. For example, the RoT or NR threshold can be adjusted as described herein along with additionally verifying the adjustment does not result in RoT or NR over the upper limit.

FIG. 5 illustrates an example methodology 500 for adjusting an RoT or NR threshold based on detecting out-of-cell interference. At 502, out-of-cell interference can be detected from one or more devices communicating with another base station. For example, the out-of-cell interference can be detected based in part on an increase in RoT and/or NR along with obtaining the signal from the one or more devices and determining a received signal power thereof.

At 504, an RoT or NR threshold can be adjusted based on the out-of-cell interference. As described, this can be as a function of the out-of-cell interference, based on the out-of-cell interference along with a data rate desired for one or more devices, based on a fixed increment, based on an upper limit, and/or the like.

At 506, one or more devices can be commanded to increase transmission power. For example, this can be based on the increase in RoT or NR threshold caused by the detected out-of-cell interference.

It will be appreciated that, in accordance with one or more aspects described herein, inferences can be made regarding determining an RoT or NR threshold adjustment, detecting interference, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
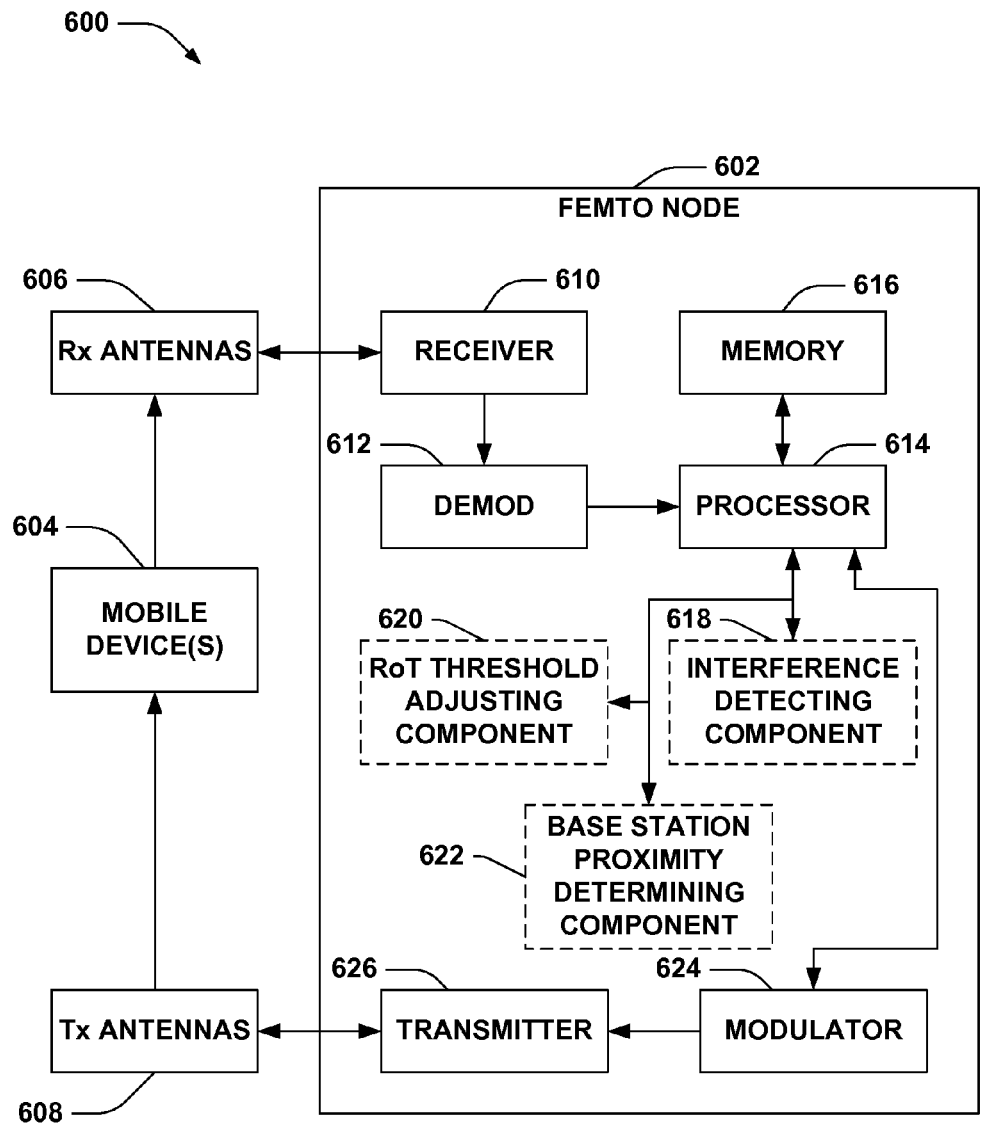
FIG. 6 is a block diagram of a system in accordance with aspects described herein.

FIG. 6 is an illustration of a system 600 that facilitates adjusting RoT or NR threshold. System 600 includes a femto node 602 having a receiver 610 that receives signal(s) from one or more mobile devices through a plurality of receive antennas 606 (e.g., which can be of multiple network technologies, as described), and a transmitter 626 that transmits to the one or more mobile devices through a plurality of transmit antennas 608 (e.g., which can be of multiple network technologies, as described). Receiver 610 can receive information from one or more receive antennas 606 and is operatively associated with a demodulator 612 that demodulates received information. Though depicted as separate antennas, it is to be appreciated that at least one of receive antennas 606 and a corresponding one of transmit antennas 608 can be combined as the same antenna. Demodulated symbols are analyzed by a processor 614, which is coupled to a memory 616 that stores information related to performing one or more aspects described herein.

Processor 614, for example, can be a processor dedicated to analyzing information received by receiver 610 and/or generating information for transmission by a transmitter 626, a processor that controls one or more components or modules of femto node 602, and/or a processor that analyzes information received by receiver 610, generates information for transmission by transmitter 626, and controls one or more components or modules of femto node 602. In addition, processor 614 can perform one or more functions described herein and/or can communicate with components or modules for such a purpose. Moreover, for example, processor 614 can be coupled to a modulator 624 for modulating signals to be transmitted by transmitter 626. Transmitter 626 can transmit signals to mobile devices 604 over Tx antennas 608.

Memory 616, as described, is operatively coupled to processor 614 and can store data to be transmitted, received data, information related to available channels, data associated with analyzed signal and/or interference strength, information related to an assigned channel, power, rate, or the like, and any other suitable information for estimating a channel and communicating via the channel. Memory 616 can additionally store protocols and/or algorithms associated with detecting handover events and/or assigning protected resources to one or more devices.

It will be appreciated that the data store (e.g., memory 616) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 616 of the subject systems and methods is intended to comprise, without being limited to, these and any other suitable types of memory.

Processor 614 is further optionally coupled to an interference detecting component 618, which can be similar to interference detecting component 210, an RoT threshold adjusting component 620, which can be similar to RoT threshold adjusting component 212, and/or a base station proximity determining component 622, which can be similar to base station proximity determining component 214. Furthermore, although depicted as being separate from the processor 614, it is to be appreciated that the interference detecting component 618, RoT threshold adjusting component 620, base station proximity determining component 622, demodulator 612, and/or modulator 624 can be part of the processor 614 or multiple processors (not shown), and/or stored as instructions in memory 616 for execution by processor 614. Moreover, for example, Rx antennas 606, receiver 610, demodulator 612, Tx antennas 608, transmitter 626, and/or modulator 624 can be part of a transceiver component 208 or similar component described herein.

Figure 7:
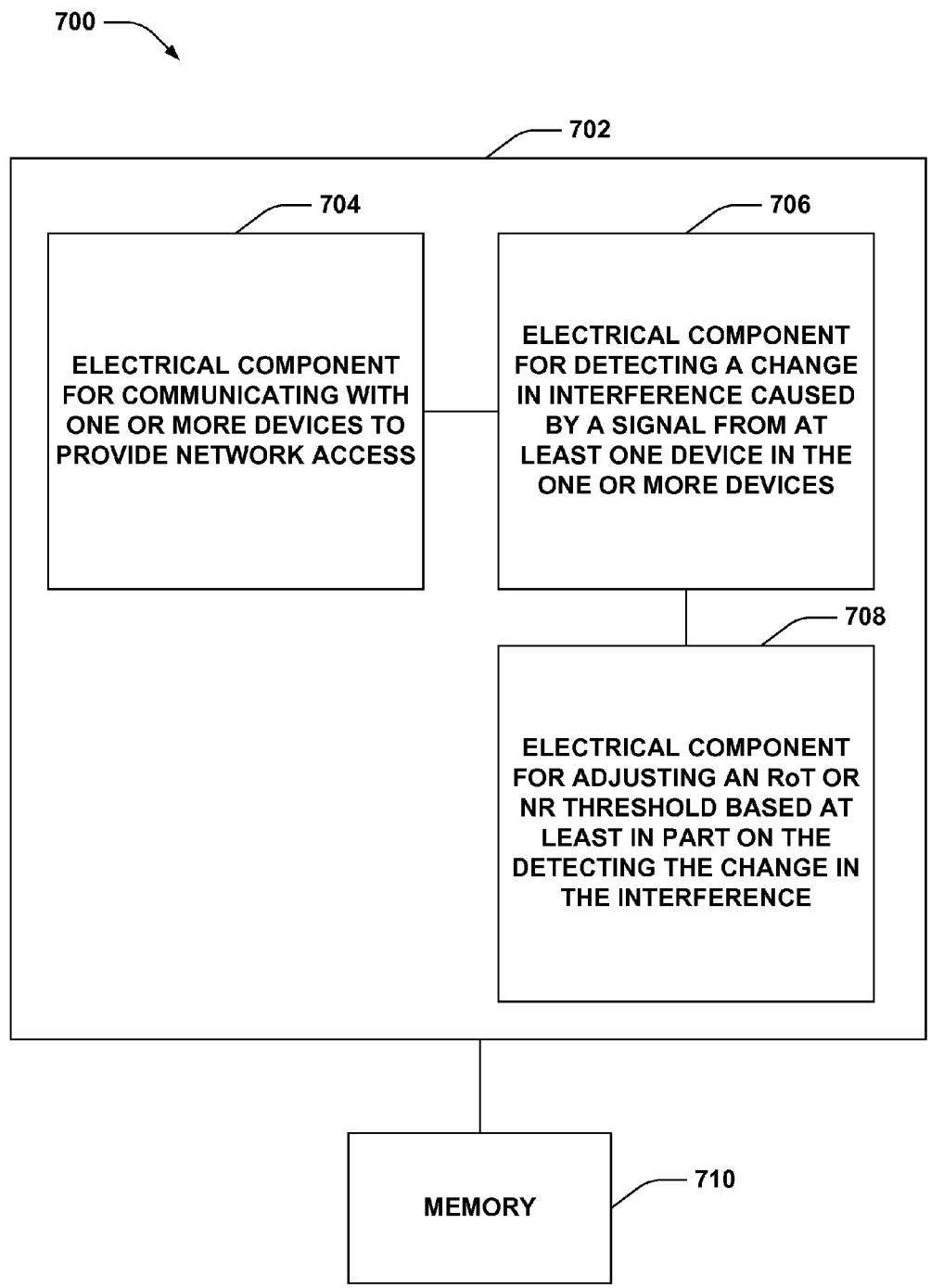
FIG. 7 is a block diagram of an aspect of a system that adjusts RoT or NR threshold.

FIG. 7 illustrates a system 700 for adjusting an RoT or NR threshold. For example, system 700 can reside at least partially within a femto node or other low power base station. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for communicating with one or more devices to provide network access 704. As described, this can include establishing connection with the one or more devices.

Further, logical grouping 702 can comprise an electrical component for detecting a change in interference caused by a signal from at least one device in the one or more devices 706. This can include detecting the at least one device is transmitting at a minimum transmit power, as described, while the received power of one or more signals from the at least one device increases, as described. Logical grouping 702 also comprises an electrical component for adjusting an RoT or NR threshold based at least in part on the detecting the change in interference 708. For example, electrical component 704 can include a transceiver component 208, as described above. In addition, for example, electrical component 706, in an aspect, can include an interference detecting component 210, as described above, and/or electrical component 708 can include a RoT threshold adjusting component 212.

Additionally, system 700 can include a memory 710 that retains instructions for executing functions associated with the electrical components 704, 706, and 708. While shown as being external to memory 710, it is to be understood that one or more of the electrical components 704, 706, and 708 can exist within memory 710. In one example, electrical components 704, 706, and 708 can comprise at least one processor, or each electrical component 704, 706, and 708 can be a corresponding module of at least one processor. Moreover, in an additional or alternative example, electrical components 704, 706, and 708 can be a computer program product comprising a computer readable medium, where each electrical component 704, 706, and 708 can be corresponding code.

Figure 8:
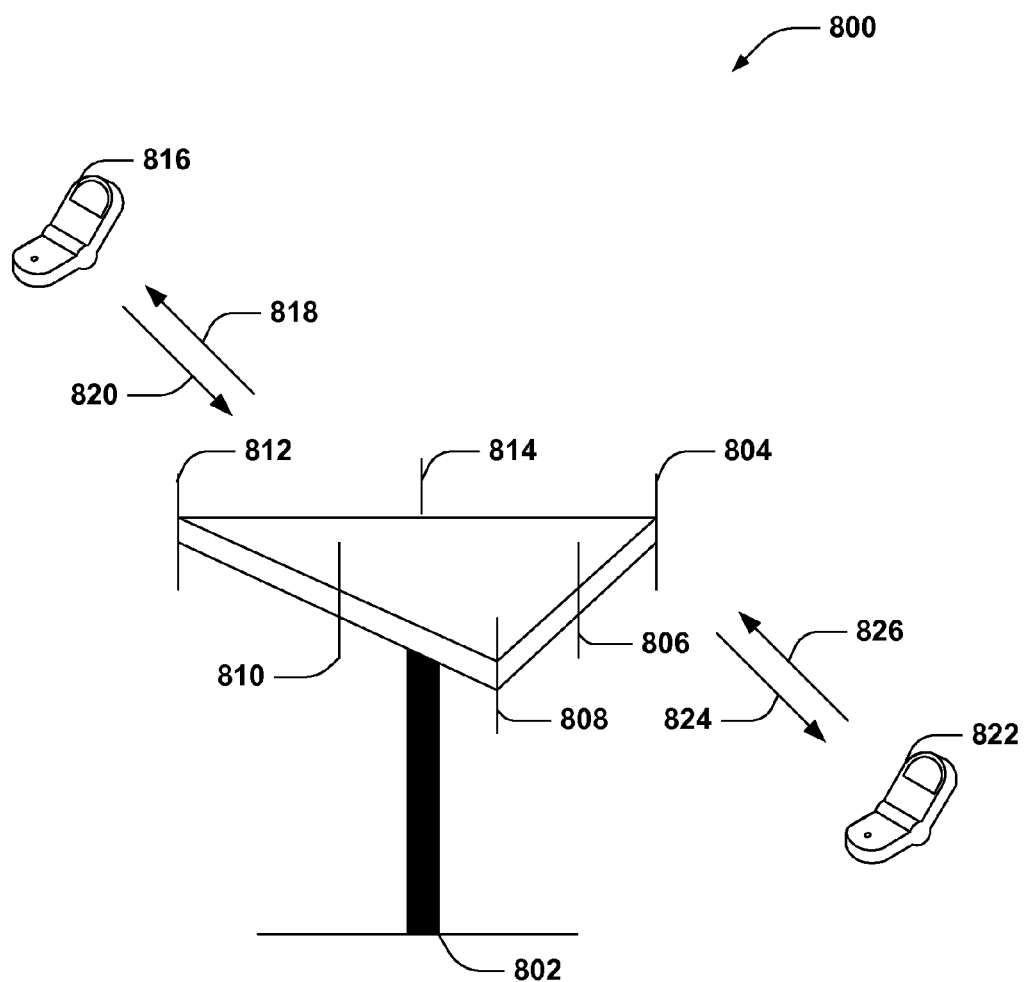
FIG. 8 is a block diagram of an aspect of a wireless communication system in accordance with various aspects set forth herein.

FIG. 8 illustrates a wireless communication system 800 in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology as depicted.

Figure 9:
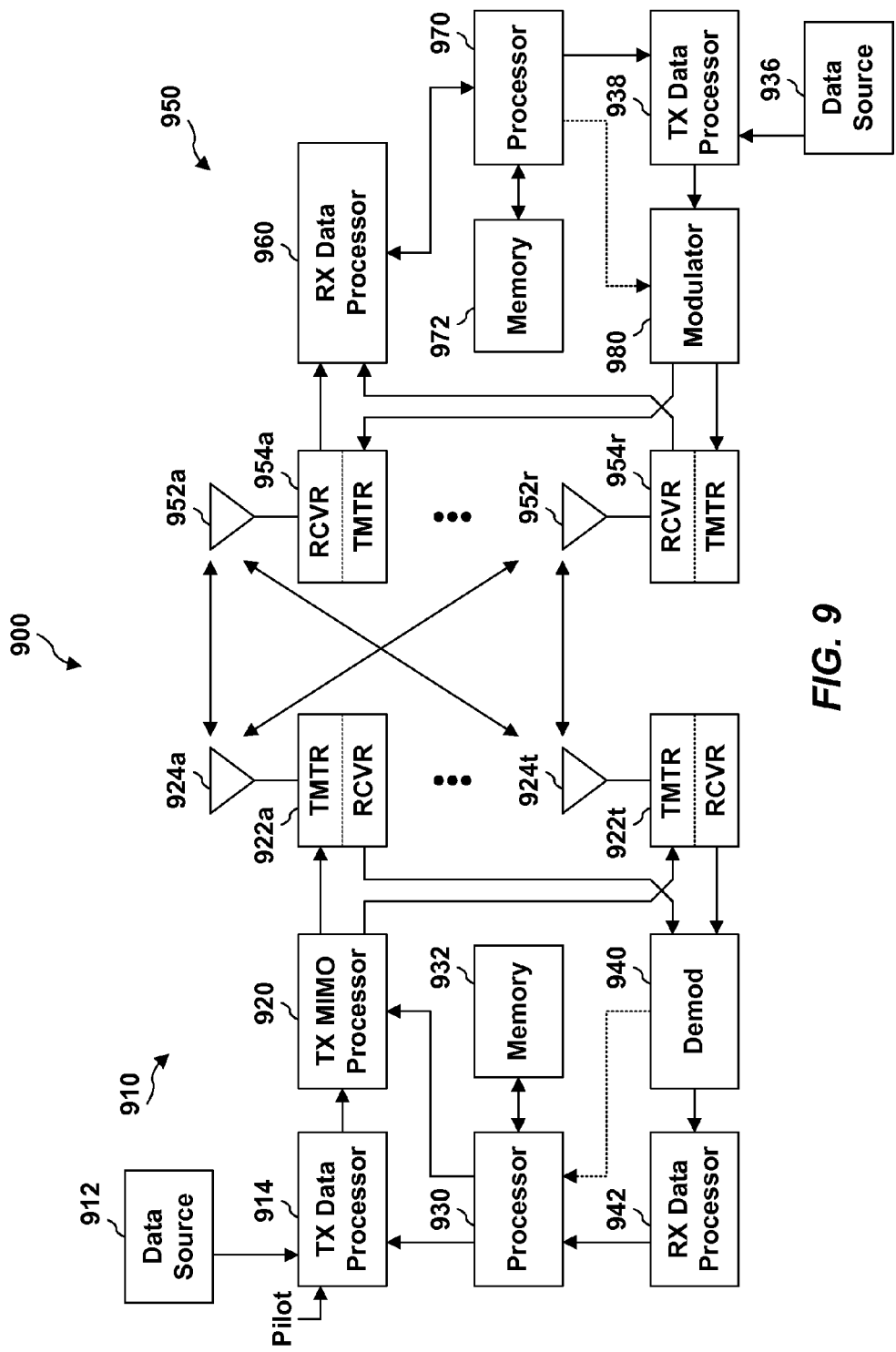
FIG. 9 is a schematic block diagram of an aspect of a wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. Moreover, base station 910 can be a low power base station, in one example, such as one or more femto nodes previously described. In addition, it is to be appreciated that base station 910 and/or mobile device 950 can employ the systems (FIGS. 1, 2, and 6-8) and/or methods (FIGS. 3-5) described herein to facilitate wireless communication there between. For example, components or functions of the systems and/or methods described herein can be part of a memory 932 and/or 972 or processors 930 and/or 970 described below, and/or can be executed by processors 930 and/or 970 to perform the disclosed functions.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. For example, processor 930 and/or 970 can execute, and/or memory 932 and/or 972 can store instructions related to functions and/or components described herein, such as adjusting RoT or NR threshold based on detected interference, as described.

Figure 10:
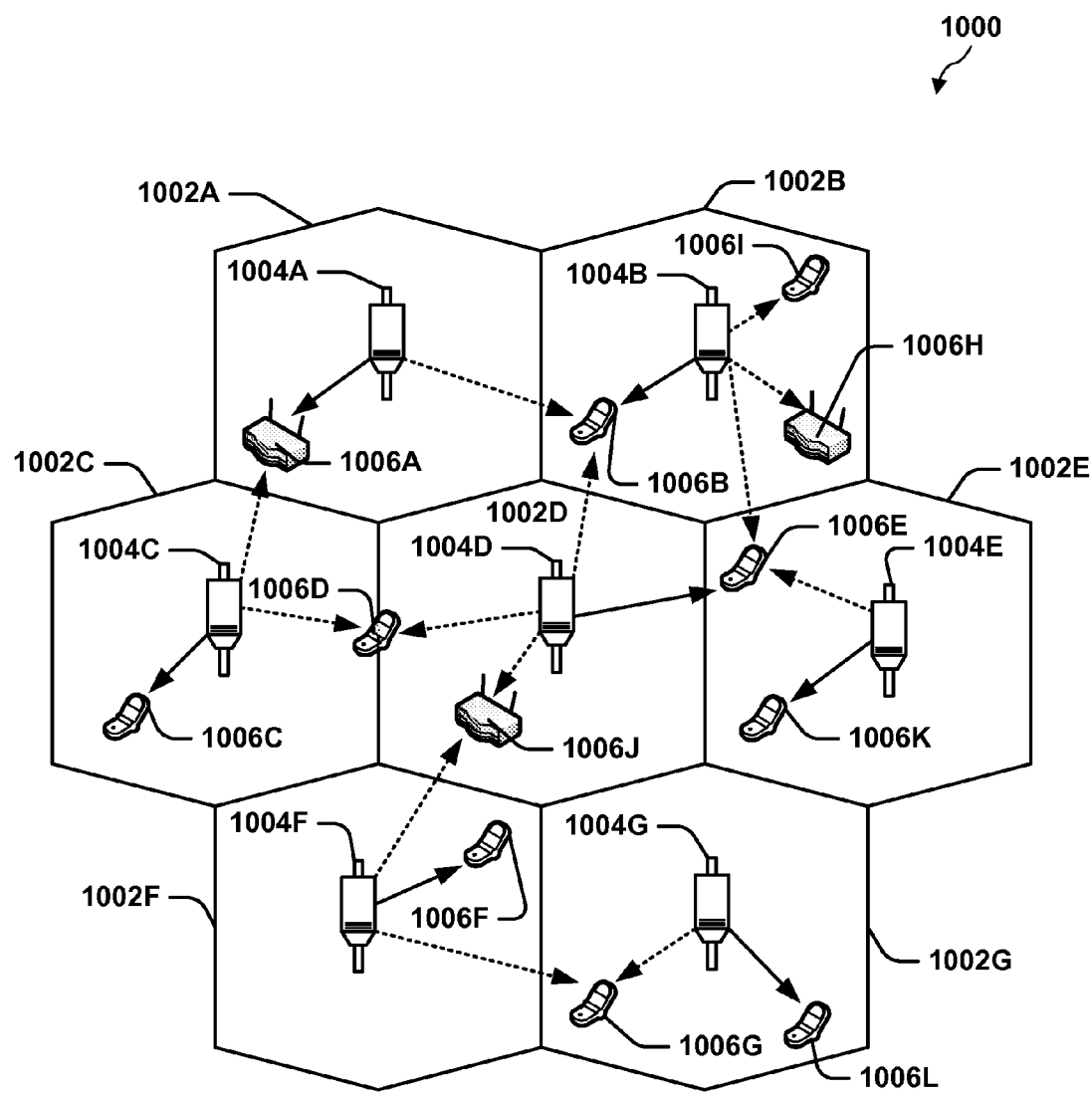
FIG. 10 illustrates an example wireless communication system, configured to support a number of devices, in which the aspects herein can be implemented.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access node 1004 (e.g., access nodes 1004A-1004G). As shown in FIG. 10, access terminals 1006 (e.g., access terminals 1006A-1006L) can be dispersed at various locations throughout the system over time. Each access terminal 1006 can communicate with one or more access nodes 1004 on a forward link (FL) and/or a reverse link (RL) at a given moment, depending upon whether the access terminal 1006 is active and whether it is in soft handoff, for example. The wireless communication system 1000 can provide service over a large geographic region.

Figure 11:
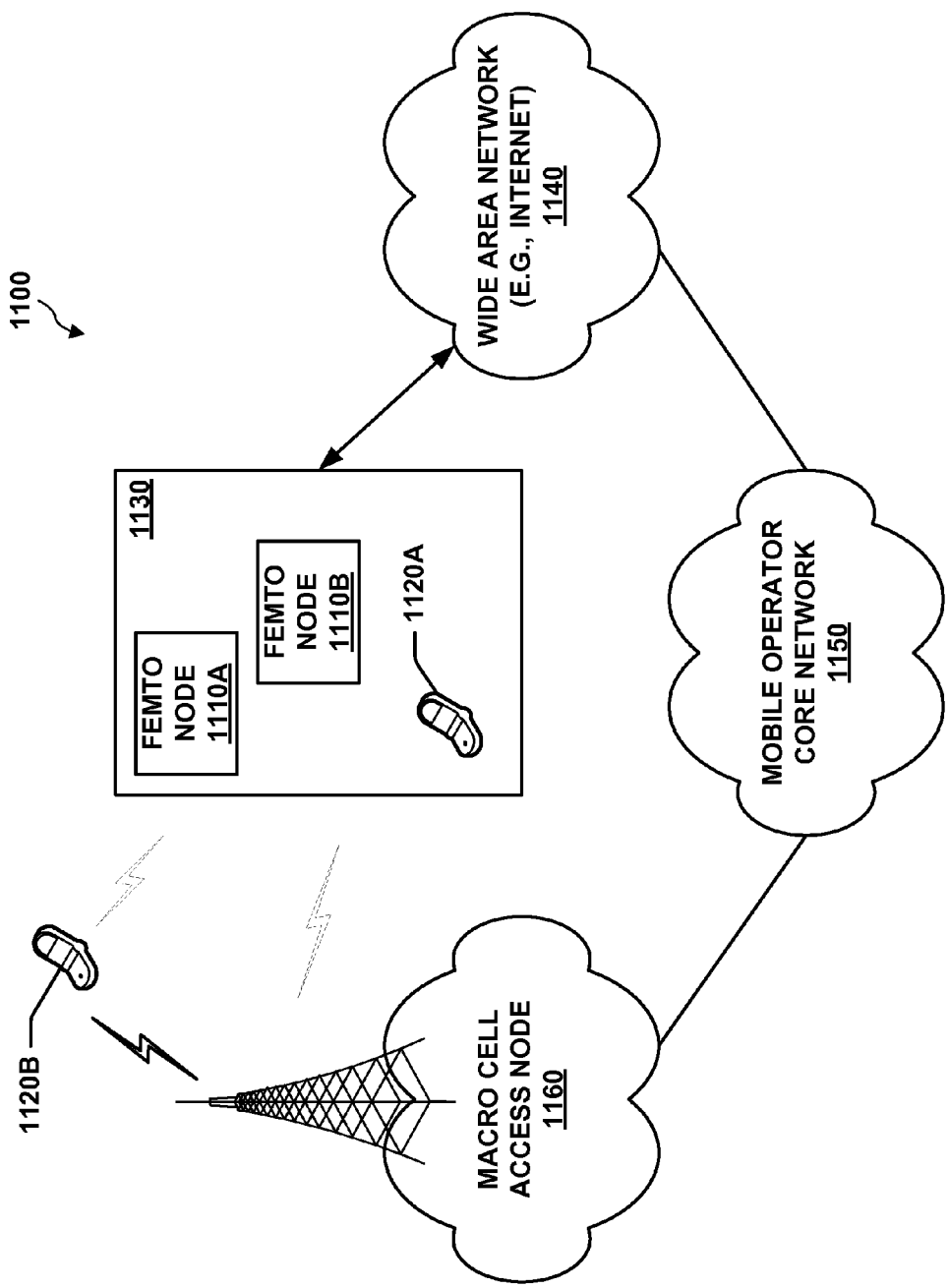
FIG. 11 is an illustration of an exemplary communication system to enable deployment of femtocells within a network environment.

FIG. 11 illustrates an exemplary communication system 1100 where one or more femto nodes are deployed within a network environment. Specifically, the system 1100 includes multiple femto nodes 1110A and 1110B (e.g., femtocell nodes or H(e)NB) installed in a relatively small scale network environment (e.g., in one or more user residences 1130). Each femto node 1110 can be coupled to a wide area network 1140 (e.g., the Internet) and a mobile operator core network 1150 via a digital subscriber line (DSL) router, a cable modem, a wireless link, or other connectivity means (not shown). As will be discussed below, each femto node 1110 can be configured to serve associated access terminals 1120 (e.g., access terminal 1120A) and, optionally, alien access terminals 1120 (e.g., access terminal 1120B). In other words, access to femto nodes 1110 can be restricted such that a given access terminal 1120 can be served by a set of designated (e.g., home) femto node(s) 1110 but may not be served by any non-designated femto nodes 1110 (e.g., a neighbor's femto node).

Figure 12:
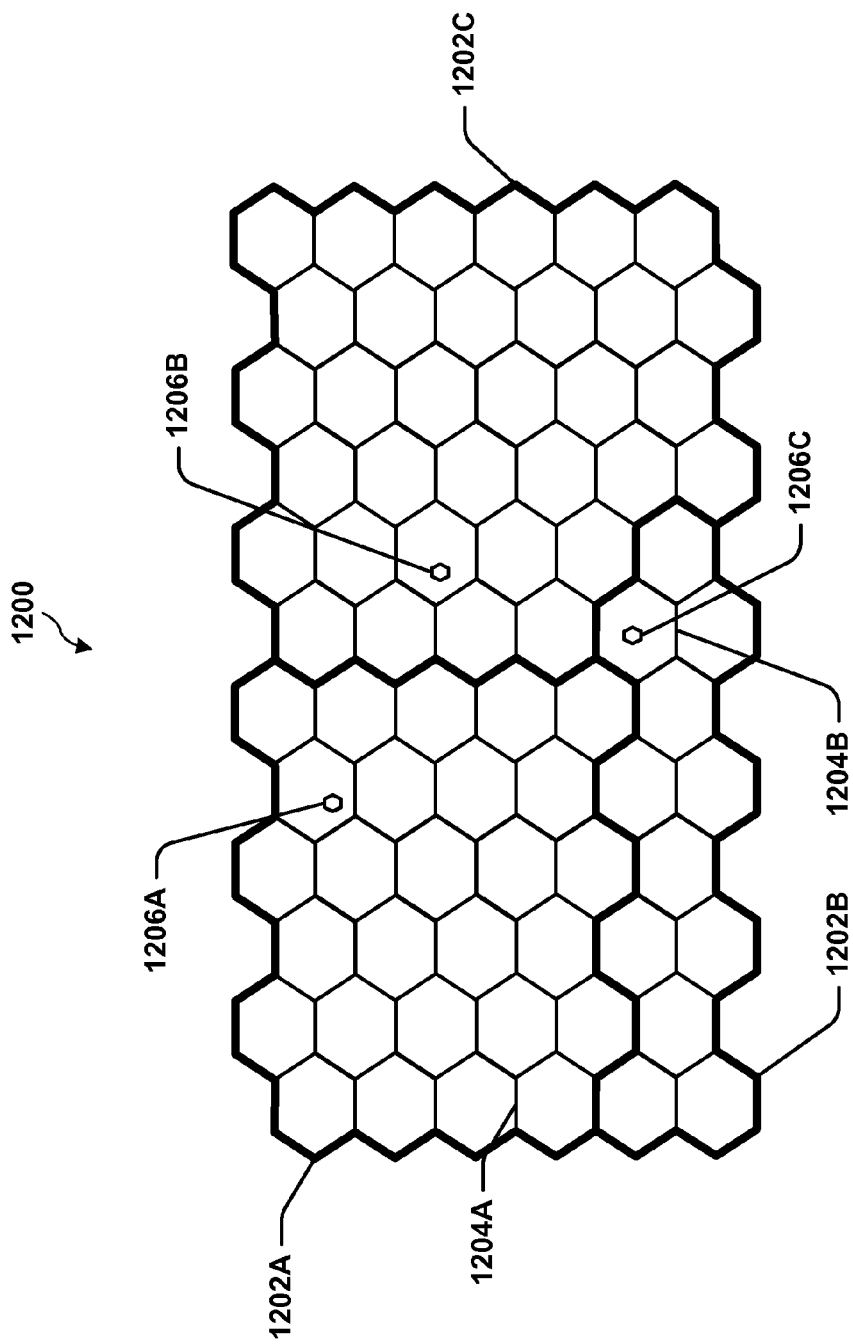
FIG. 12 illustrates an example of a coverage map having several defined tracking areas.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 can be defined with a given tracking area 1202 or macro coverage area 1204. Also, one or more pico coverage areas (not shown) can be defined within a given tracking area 1202 or macro coverage area 1204.

Referring again to FIG. 11, the owner of a femto node 1110 can subscribe to mobile service, such as, for example, 3G mobile service, offered through the mobile operator core network 1150. In addition, an access terminal 1120 can be capable of operating both in macro environments and in smaller scale (e.g., residential) network environments. Thus, for example, depending on the current location of the access terminal 1120, the access terminal 1120 can be served by an access node 1160 or by any one of a set of femto nodes 1110 (e.g., the femto nodes 1110A and 1110B that reside within a corresponding user residence 1130). For example, when a subscriber is outside his home, he is served by a standard macro cell access node (e.g., node 1160) and when the subscriber is at home, he is served by a femto node (e.g., node 1110A). Here, it should be appreciated that a femto node 1110 can be backward compatible with existing access terminals 1120.

A femto node 1110 can be deployed on a single frequency or, in the alternative, on multiple frequencies. Depending on the particular configuration, the single frequency or one or more of the multiple frequencies can overlap with one or more frequencies used by a macro cell access node (e.g., node 1160). In some aspects, an access terminal 1120 can be configured to connect to a preferred femto node (e.g., the home femto node of the access terminal 1120) whenever such connectivity is possible. For example, whenever the access terminal 1120 is within the user's residence 1130, it can communicate with the home femto node 1110.

In some aspects, if the access terminal 1120 operates within the mobile operator core network 1150 but is not residing on its most preferred network (e.g., as defined in a preferred roaming list), the access terminal 1120 can continue to search for the most preferred network (e.g., femto node 1110) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1120 can limit the search for specific band and channel. For example, the search for the most preferred system can be repeated periodically. Upon discovery of a preferred femto node, such as femto node 1110, the access terminal 1120 selects the femto node 1110 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1110 that reside within the corresponding user residence 1130). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for adjusting a rise-over-thermal (RoT) or noise rise (NR) threshold, comprising:
communicating with one or more devices to provide network access;
detecting a change in a level of interference caused by a signal from at least one device in the one or more devices, wherein detecting the change in the level of interference comprises detecting an increase in a received signal power of the signal received from the at least one device;
determining that the at least one device transmits the signal at a minimum transmit power, wherein determining that the at least one device transmits the signal at a minimum transmit power comprises determining that the at least one device does not respond to one or more commands to decrease the power for transmitting the signal; and adjusting an RoT or NR threshold in proportion to the level of interference detected and based on the determination that the at least one device transmits the signal at a minimum transmit power.

2. The method of claim 1, further comprising determining an upper limit for the RoT or NR threshold based in part on a determined proximity to one or more base stations, wherein the adjusting is based in part on the upper limit.

3. The method of claim 1, further comprising:

detecting a decrease in the interference caused by a second signal from the at least one device; and decreasing the RoT or NR threshold based in part on detecting the decrease in the interference, wherein the at least one device is previously determined to transmit at a minimum transmit power.

4. An apparatus for adjusting a rise-over-thermal (RoT) or noise rise (NR) threshold, comprising:

at least one processor configured to:

communicate with one or more devices to provide network access;

detect a change in a level of interference caused by a signal from at least one device in the one or more devices, wherein detecting the change in the level of interference comprises detecting an increase in a received signal power of the signal received from the at least one device;

determine that the at least one device transmits the signal at a minimum transmit power, wherein determining that the at least one device transmits the signal at a minimum transmit power comprises determining that the at least one device does not respond to one or more commands to decrease the power for transmitting the signal; and adjust an RoT or NR threshold in proportion to the level of interference detected and based on the determination that the at least one device transmits the signal at a minimum transmit power; and a memory coupled to the at least one processor.

5. The apparatus of claim 4, wherein the at least one processor is further configured to determine an upper limit for the RoT or NR threshold based in part on a determined proximity to one or more base stations, wherein the at least one processor adjusts the RoT or NR threshold based in part on the upper limit.

6. The apparatus of claim 4, wherein the at least one processor is further configured to:

detect a decrease in the interference caused by a second signal from the at least one device; and decrease the RoT or NR threshold based in part on the decrease in the interference, wherein the at least one device is previously determined to transmit at a minimum transmit power.

7. An apparatus for adjusting a rise-over-thermal (RoT) or noise rise (NR) threshold, comprising:

means for communicating with one or more devices to provide network access;

means for detecting a change in a level of interference caused by a signal from at least one device in the one or more devices, wherein the means for detecting the change in the level of interference comprise means for detecting an increase in a received signal power of the signal received from the at least one device;

means for determining that the at least one device transmits the signal at a minimum transmit power, wherein the means for determining that the at least one device transmits the signal at a minimum transmit power comprise means for determining that the at least one device does not respond to one or more commands to decrease the power for transmitting the signal; and means for adjusting an RoT or NR threshold in proportion to the level of interference detected and based on the determination that the at least one device transmits the signal at a minimum transmit power.

8. The apparatus of claim 7, wherein the means for adjusting determines an upper limit for the RoT or NR threshold based in part on a determined proximity to one or more base stations, and adjusts the RoT or NR threshold based in part on the upper limit.

9. The apparatus of claim 7, wherein the means for detecting detects a decrease in the interference caused by a second signal from the at least one device, wherein the means for adjusting decreases the RoT or NR threshold based in part on the decrease in interference, and wherein the at least one device is previously determined to transmit at a minimum transmit power.

10. A non-transitory computer-readable medium, comprising:

code for causing at least one computer to communicate with one or more devices to provide network access;

code for causing the at least one computer to detect a change in a level of interference caused by a signal from at least one device in the one or more devices, wherein the code for causing the at least one computer to detect the change in the level of interference comprises code for causing the at least one computer to detect an increase in a received signal power of the signal received from the at least one device;

code for causing the at least one computer to determine that the at least one device transmits the signal at a minimum transmit power, wherein the code for causing the at least one computer to determine that the at least one device transmits the signal at a minimum transmit power comprises code for causing the at least one computer to determine that the at least one device does not respond to one or more commands to decrease the power for transmitting the signal; and code for causing the at least one computer to adjust rise-over-thermal (RoT) or noise rise (NR) threshold in proportion to the level of interference detected and based on the determination that the at least one device transmits the signal at a minimum transmit power.

11. The non-transitory computer-readable medium of claim 10, further comprising code for causing the at least one computer to determine an upper limit for the RoT or NR threshold based in part on a determined proximity to one or more base stations, wherein the code for causing the at least one computer to adjust adjusts the RoT or NR threshold based in part on the upper limit.

12. The non-transitory computer-readable medium of claim 10, further comprising:

code for causing the at least one computer to detect a decrease in the interference caused by a second signal from the at least one device; and code for causing the at least one computer to decrease the RoT or NR threshold based in part on the decrease in the interference, wherein the at least one device is previously determined to transmit at a minimum transmit power.

13. An apparatus for adjusting a rise-over-thermal (RoT) or noise rise (NR) threshold, comprising:

a transceiver component for communicating with one or more devices to provide network access;

an interference detecting component for:
   detecting a change in a level of interference caused by a signal from at least one device in the one or more devices, wherein detecting the change in the level of interference comprises detecting an increase in a received signal power of the signal received from the at least one device, and
   determining that the at least one device transmits the signal at a minimum transmit power, wherein determining that the at least one device transmits the signal at a minimum transmit power comprises determining that the at least one device does not respond to one or more commands to decrease the power for transmitting the signal; and
   an RoT threshold adjusting component for adjusting an RoT or NR threshold in proportion to the level of interference detected and based on the determination that the at least one device transmits the signal at a minimum transmit power.

14. The apparatus of claim 13, wherein the RoT threshold adjusting component determines an upper limit for the RoT or NR threshold based in part on a determined proximity to one or more base stations, and adjusts the RoT or NR threshold based in part on the upper limit.

15. The apparatus of claim 13, wherein the interference detecting component detects a decrease in the interference caused by a second signal from the at least one device, and wherein the RoT threshold adjusting component decreases the RoT or NR threshold based in part on the decrease in the interference, wherein the at least one device is previously determined to transmit at a minimum transmit power.

* * * * *